May 7, 1968

J. S. CROMEANS 3,382,044

REMOVAL OF SULFUR COMPOUNDS IN STEAM-GAS REFORMING
AND SHIFT CONVERSION PROCESSES

Filed Feb. 3, 1965

INVENTOR.
JOHN S. CROMEANS
By Thomas L. Wilson Jr.

United States Patent Office 3,382,044
Patented May 7, 1968

3,382,044
REMOVAL OF SULFUR COMPOUNDS IN STEAM-GAS REFORMING AND SHIFT CONVERSION PROCESSES
John S. Cromeans, Louisville, Ky., assignor to Catalysts & Chemicals Inc., Louisville, Ky., a corporation of Delaware
Filed Feb. 3, 1965, Ser. No. 430,021
4 Claims. (Cl. 23—212)

ABSTRACT OF THE DISCLOSURE

Elimination of sulfur following steam-gas reforming is provided for even though sulfur removal means precedes the reforming operation. Sulfur is removed from any reformer effluent containing more than one part per million sulfur compounds. In addition a desulfurizing means effective at high temperatures and with steam present is provided.

---

This invention pertains to improvements in operating steam-gas reforming processes, particularly those reforming processes employing low temperature shift catalysts. In another of its embodiments the invention contemplates the novel use of sulfur compound removal means in gas reforming.

The most important uses of hydrogen today are its use in the petrochemical industry and for the synthesis of ammonia. To produce hydrogen for these purposes, a gas reforming process is generally used. In gas reforming, natural gas, naphtha or low molecular weight hydrocarbons such as methane, ethane, or propane is usually reacted with steam. Steam and hydrocarbons, when passed over a catalyst containing certain metals, form hydrogen, carbon monoxide and carbon dioxide. In a second stage of this well known and commercial process for hydrogen production the process is operated to bring about a water gas shift reaction by which carbon monoxide and water, or steam, are reacted to form carbon dioxide and additional hydrogen. The carbon monoxide must be thus converted to carbon dioxide to be readily and economically removed from the system to produce pure hydrogen. In effecting reforming to produce hydrogen, the following are the reactions using methane as the feed gas.

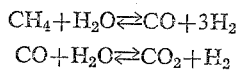

$$CH_4 + H_2O \rightleftharpoons CO + 3H_2$$

$$CO + H_2O \rightleftharpoons CO_2 + H_2$$

The production of hydrogen from steam and gaseous hydrocarbons according to the foregoing reactions is markedly endothermic. Hence, to establish an equilibrium resulting in the desired composition of gaseous products, it is desirable to use high temperatures, for example from 1100° F. to as high as 2500° F. Conversion temperatures of 1100° F. to 2000° F. are generally employed in reforming furnaces. The higher temperatures, up to 2500° F., are employed in adiabatic units. Reforming furnaces usually are multi-tube reactors. Such furnaces are equipped with vertical catalyst-filled tubes which are twenty to forty feet long, having diameters of two to ten inches. Adiabatic reformers are unfired single-bed reactors which can be used alone, or following a reforming furnace, as a secondary reformer. Heat is supplied by a combustion reaction in the top of the adiabatic reactor, oxygen being injected. The catalyst employed in the tubes of a reforming furnace, or in an adiabatic reformer, normally consists of a metal of the iron group of the Periodic Table, for instance nickel or iron, deposited on a temperature resistant support.

In reforming processes for reacting steam with a gaseous hydrocarbon as described, the feed gas stream is passed through a desulfurization zone before first passing through the steam-gas reforming zone, or the shift conversion zone which follows. As a consequence the effects of minute amounts of sulfur have not been perceived. In other words, whereas sulfur compounds have been removed from the hydrocarbon feed stream itself, other possible sources of sulfur have gone unnoticed. It has been found, however, that there are several sources of sulfur between a desulfurizer and a shift converter in a reforming process. It has also been found that these compounds have a deleterious effect on low temperature shift catalysts now coming into use.

Low temperature shift processes are carbon monoxide conversion processes carried out in the presence of a catalyst active at temperatures below 600° F., generally 350° F. to 500° F. One low temperature shift catalyst is a reduced copper oxide-zinc oxide catalyst described in U.S. Patent 3,303,001. Another low temperature shift catalyst is described in U.S. Pat. 1,797,426. Low temperature shift processes are used either to replace conventional high temperature shift conversion processes, or they are used as one stage of a high temperature-low temperature shift conversion process. Because of the increased use of low temperature shift conversion processes, the effect of sulfur on low temperature shift catalysts is a matter of concern.

The origin of sulfur which can come into contact with catalysts when low temperature shift conversion stages are used is either operational or inherent. Inherent sources of sulfur generally result in a single exposure of the shift catalyst to sulfur. In the case of operational sources the shift catalyst is intermittently exposed to sulfur. While sulfur or sulfur compounds from sources with which we are concerned herein is usually present in the gas stream in less than 5 parts per million, it has been found that such quantities are nevertheless sufficiently significant to be detrimental to a low temperature shift catalyst. Sulfur of inherent origin includes such sources as piping and refractory linings. Sulfur from pipes throughout a reforming plant frequently accumulates in the gas stream on its way from the desulfurizer to the shift converter. This is particularly true in the case of newly installed pipes. Refractory linings in reformers also are often a source of sulfur compounds.

Intermittent sources of sulfur compounds are those occurring through unforeseen changes. These generally must be corrected or the presence of sulfur in the stream will be continuous. An example of one such source of sulfur is steam, employed in the reformer. Another example of a possible source of sulfur is air, admitted to a secondary reformer. Both air and steam frequently contain quantities of sulfur or sulfur compounds, small, but sufficient to be injurious to a low temperature shift catalyst. The operation of the desulfurizer is another possible source of sulfur. Gas from a desulfurization zone is free of sulfur compounds most of the time. However, occasionally due to a loss of adsorption, attrition and the like, sulfur leaks through.

In accordance with this invention gases flowing to a low temperature shift converter should contain not more than 1 part per million (p.p.m.) sulfur from any source. The problem of preventing sulfur from contacting the low temperature catalyst is complicated by the presence of steam. Sulfur compounds obviously could be removed by liquid absorbents and the like if the stream were cooled sufficiently to condense the steam. However it would be necessary afterwards to super-heat the gas stream and add more steam. According to this invention a process is provided for eliminating sulfur at the reaction temperature and without condensing the steam. The invention in one aspect contemplates by-passing low temperature shift conversion with any reformer effluent containing more than 1 p.p.m. sulfur compounds. In another aspect the invention involves the use of desulfurizing means effective at high temperatures and with steam present.

Hydrogen plants heretofore have not been provided with converter by-pass means in their design. By the practice of this invention the gas stream to the low temperature shift converter is tested for sulfur at least every 24 hours, by lead acetate tape or otherwise. In many instances the presence of sulfur is indicated by a rise in reforming temperatures. Usually the outside reformer tube skin temperature rises above normal operating temperatures when sulfur is present. If tests are made only periodically rather than continuously, such tests should be made when tube skin temperature rises above normal. Preferably the stream is tested by means of a continuous sulfur analyzer such as Minneapolis Honeywell's "Rubicon," Martin Instrument's "Triton" or Consolidated Electrodynamic's "Titralog." The test can best be made of a sample of gas entering the shift converter, but it can be made before or after the reformer. If the test shows the gas to contain more than 1 p.p.m. the by-pass means is put into operation. If the shift conversion process includes a high temperature shift conversion stage followed by a low temperature shift conversion stage as set forth in application Ser. No. 454,392, filed May 10, 1965, then the stream is passed from the high temperature shift conversion directly to carbon dioxide removal, less pure hydrogen being made. If a low temperature shift converter is employed by itself, the reformer effluent is recycled back to the desulfurization zone until the stream on its way to the shift converter passes the sulfur test.

As indicated hereinbefore a cooler is used in the line between the high temperature shift converter and the low temperature shift converter. In one embodiment, desulfurizing means are disposed in parallel with a line from this converter effluent cooler to the low temperature shift conversion zone. Thus if the effluent from the high temperature shift conversion zone contains sulfur, or sulfur compounds, the stream can be conducted through the desulfrizer after being cooled for passage to the low temperature shift conversion zone. In other words, the effluent, cooled to 350° F. to 600° F., is passed over a solid capable of absorbing sulfur compounds at said high temperature in the presence of steam prior to its admission to low temperature shift conversion. This arrangement provides an efficient means for elimination of sulfur which intermittently may enter the gas stream.

Another embodiment of the invention provides for sulfur compound removal when the reforming stage is followed by only low temperature shift conversion. One desirable method for use in this instance is to provide desulfurization just ahead of one or more low temperature shift conversion stages.

A preferred method of eliminating sulfur from inherent sources entails an improved start-up procedure. This procedure involves passing a hydrogen-containing gas stream through the entire reforming system ahead of the low temperature shift converter under normal operating conditions, the low temperature shift converter being bypassed, until sulfur in the hydrogen stream is 1 p.p.m. or less. The reforming process is then put onstream with a hydrocarbon and steam.

When sulfur compounds are to be removed without condensing steam, the line ahead of a low temperature shift converter, either in direct flow for continuous use, or in parallel for intermittent use, will contain solid adsorbents for sulfur compounds. Such solid adsorbents include silica gels, iron oxides, activated carbon, molecular sieves, zinc oxide and the like.

A preferred reforming process contemplates conventional reforming, followed by zinc oxide sulfur adsorption, the adsorption preceding low temperature shift conversion. Zinc oxide will adsorb hydrogen sulfide very effectively at operating temperature, and even at higher temperatures up to 800° F. In the desired 500° F. to 600° F. temperature range RSH and COS are also adsorbed. Desulfurizer drums containing ZnO usually operate herein at temperatures between 350° F. and 500° F. in order to remove the sulfur compounds. The steam which is present will aid in the prevention of carbon formation at these temperatures. It is not practical to regenerate zinc oxide, although roasting with air at 600° F. has been used. Normally the material is discarded after a sulfur breakthrough.

To illustrate the use of zinc oxide and other adsorbents in a specific embodiment for the removal of sulfur compounds reference is made to the accompanying drawing. The drawing is for the purpose of exemplification only.

Figure 1:
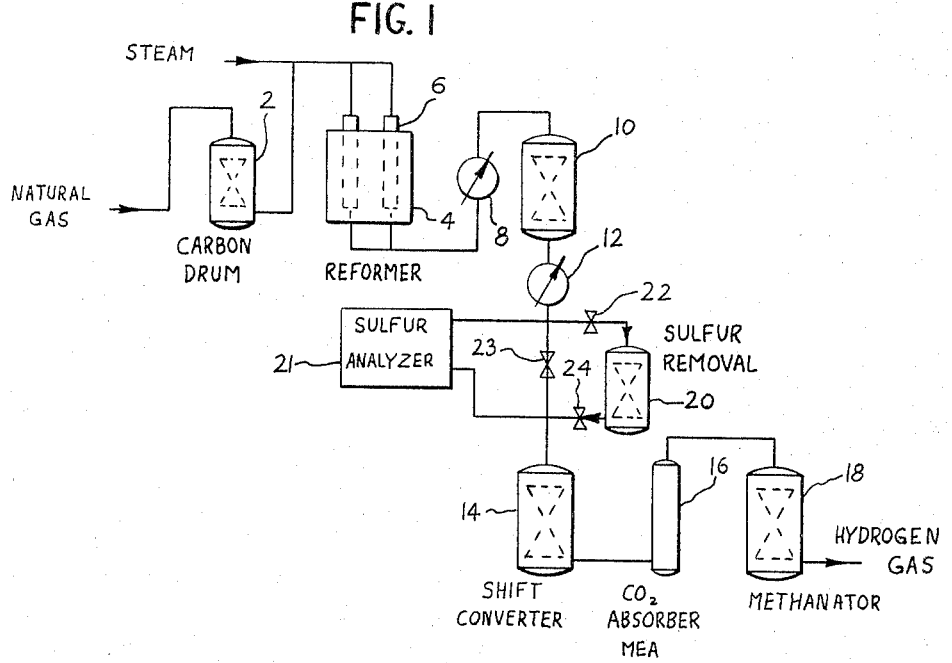
FIGURE 1 is a process for the production of hydrogen by steam gas reforming wherein two shift converters are used, the first operating at high temperature, the second at low temperature.

Reference to the drawing shows that in each process natural gas or a similar hydrocarbon vapor is desulfurized by activated carbon in an adsorber 2. The desulfurized gas stream is then reacted with steam in tubes 6 of reforming furnace 4. Tubes 6 are filled with a catalyst such as nickel oxide or chromium oxide on a refractory support such as calcium silicate or aluminate. The reforming furnace is operated so that the reforming temperature, inside tube temperature, is 1200° F. to 1700° F.

After being reformed the gas from reformer 4 is to be shifted to convert carbon monoxide in the gas stream to carbon dioxide and hydrogen. The reformer effluent from furnace 4 is cooled by heat exchange means 8 to a temperature of 650° F. to 800° F. in the process shown in FIGURE 1 and to below 500° F. in the process of FIGURE 2. Referring to FIGURE 1, the 650° F. to 800° F. stream is reacted with steam in shift converter 10 filled with an iron oxide-chromium oxide catalyst. The stream is then cooled in heat exchanger 12 and passed to low temperature shift catalyst zone 14. This zone contains a copper-zinc catalyst. Carbon dioxide resulting from conversion of carbon monoxide values in the shift converter is removed in conventional absorber 16 containing monoethanol amine (MEA). In addition remaining poisonous carbon monoxides and any trace of carbon dioxide are converted to methane in methanator 18. The process of FIGURE 2 is similar to that of FIGURE 1 except only a single stage 15 of low temperature shift conversion is included.

The improvement of this invention is illustrated at 20 and 21 in the accompanying drawing. A continuous sulfur analyzer 21 (FIG. 1) records the quantity of sulfur or sulfur compounds which appear intermittently in the reformer effluent. If this quantity exceeds 1 part per million valves 22 and 24 are opened and 23 is closed to divert the gas stream through sulfur removal drum 20, to prevent sulfur from contacting low temperature shift catalyst in converter 14.

Figure 2:
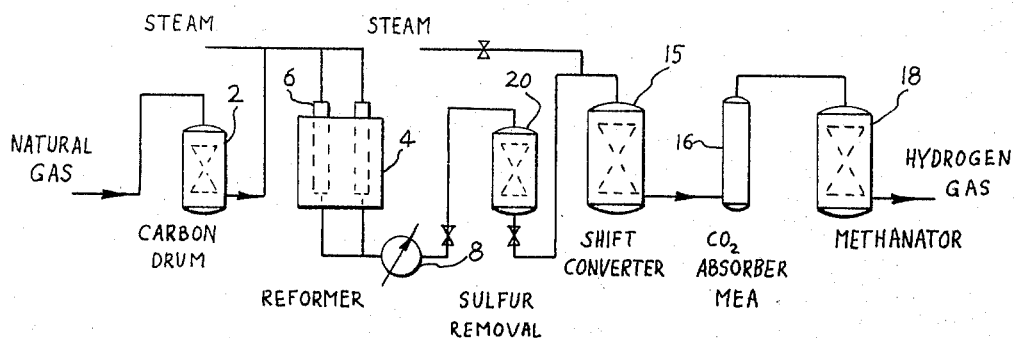
FIGURE 2 is a similar process which employs only a single stage low temperature carbon monoxide converter.

Another embodiment of this invention shown in FIGURE 2 contemplates the continuous use of zinc oxide as an adsorbent in 20 ahead of low temperature shift converter 15. In this embodiment no sulfur analyzer is necessary since all of the gas is passing over the zinc oxide. Sulfur compounds will be removed when they are present.

The operation of the invention is illustrated in a specific embodiment wherein zinc oxide was employed in a commercial installation for the production of hydrogen by the process exemplified in FIGURE 1. This plant had a zinc oxide sulfur adsorber following a high temperature iron shift catalyst and ahead of a low temperature copper-zinc shift catalyst. Usually zinc oxide adsorbs 10 percent to 20 percent hydrogen sulfide and similar compounds depending upon steam gas ratios and similar factors. However, in this example since this plant was being put on stream a determination was made at a theoretical adsorption of 3.4 percent sulfur to check the operation of the zinc oxide. The data is as follows:

TABLE

High temp. shift converter effluent:
  S—130-140 p.p.m.
  CO—3.5%.
  $CO_2$—22.5%.
  $N_2$—19.0%.
  $H_2$—55.0%.
Adsorbent:
  Zinc Oxide, ¼″ x ¼″ tablets—72 gms., 50 cc.
Process Conditions:
  Steam gas ratio—0.55.
  Temp.—450° F.
  Pressure—245 p.s.i.g.
  Space Velocity—10,000, 5,000, 3,000, 2,000.

| Time | Conditions Space Velocity | Analysis of Sulfur | | $H_2S$ Adsorbed (cc.) |
|---|---|---|---|---|
| | | In | Out | |
| First Day: | | | | |
| 11:00 a.m. | 10,000 | 50+ | 0 | |
| 3:00 p.m. | 10,000 | 50+ | 1 | |
| 4:00 p.m. | 5,000 | 50+ | 1+ | |
| 5:00 p.m. | 2,000 | 50+ | 0 | |
| First Night: | | | | 400 |
| 6:00 p.m. | 2,000 | 100+ | 0 | |
| 8:00 a.m. | 2,000 | 100+ | 0 | |
| Second Day: | | | | 480 |
| 11:00 a.m. | 10,000 | 100+ | 8 | |
| 3:00 p.m. | 10,000 | 100+ | 8 | |
| 4:00 p.m. | 5,000 | 100+ | 4 | |
| 5:00 p.m. | 2,000 | 100+ | 1 | |
| Second Night: | | | | 400 |
| 6:00 p.m. | 2,000 | 100+ | 1 | |
| 1:00 a.m. | 2,000 | 100+ | 3 | |
| | | | | 480 |
| Total $H_2S$ adsorbed | | | | [1] 1,760 |

[1] 0.08 gram-mol.

Calculation:
  (32 gm. mols) (0.08 gm. mol) = 2.56 gm. S
  Catalyst Weight 72.5 + 2.56 = 75.06

$$\text{Therefore percent sulfur} = \frac{2.55}{75.06} = 3.4\%.$$

Adsorbent contents by analysis should be approximately 3.4% sulfur. Adsorbent was removed from the reactor in segments and analyzed for percent sulfur.

ADSORBENT ANALYSIS

| | Weight | Weight Sulfur (gm.) | Percent Sulfur |
|---|---|---|---|
| Top Segment | 18.2 | 0.94 | 5.15 |
| Middle Segment | 17.1 | 0.56 | 3.30 |
| Middle Segment | 12.3 | 0.20 | 1.65 |
| Bottom Segment | 22.5 | 0.19 | 0.85 |
| | 70.1 | 1.89 | |

Calculation:

$$\text{Percent sulfur found in zinc oxide} = \frac{(1.89)}{(70.1)}(100) = 2.70\%.$$

The foregoing example shows that the use of this invention leads to many advantages. The result will be a great saving in the low temperature shift catalyst.

The foregoing example illustrates the use of this invention in one commercial installation. Obviously various changes will be made depending upon the installation in which the process is used and other factors. Such variations and ramifications are deemed to be within the scope of this invention.

What is claimed is:

1. In a reforming process for reacting steam with a gaseous hydrocarbon feed gas wherein the feed gas stream is passed through desulfurization, steam-gas reforming and shift conversion zones in succession, and wherein a shift conversion zone is a low temperature zone, the steps of removing sulfur compounds from feed gas passing over catalyst in said low temperature shift conversion zone and of maintaining the quantity of sulfur in said feed gas below one part per million, the steps being accomplished by passing said feed gas stream prior to the low temperature shift conversion zone, through a desulfurization zone containing a solid adsorbent capable of removing sulfur at a temperature above 350° F. and with steam present.

2. The process of claim 1 wherein the desulfurizing compound is zinc oxide.

3. The process of claim 1 wherein the desulfurizing compound is silica gel.

4. The process of claim 1 wherein the desulfurizing compound is a molecular sieve.

References Cited

UNITED STATES PATENTS

| | | | |
|---|---|---|---|
| 2,984,548 | 5/1961 | Massey | 23—212 |
| 3,074,783 | 1/1963 | Paull | 23—213 XR |
| 3,115,394 | 12/1963 | Gorin et al. | 23—212 |
| 3,271,110 | 9/1966 | Bratzler | 23—212 |
| 3,303,001 | 2/1967 | Dienas | 23—213 |

OSCAR R. VERTIZ, *Primary Examiner.*

EDWARD STERN, *Examiner.*